United States Patent
McCloud et al.

[11] Patent Number: 5,850,758
[45] Date of Patent: Dec. 22, 1998

[54] TRANSMISSION FOR SELF-PROPELLED WALKING LAWN MOWERS

[75] Inventors: Travis McCloud, Morristown, Tenn.; Hirohiko Kawada, Amagasaki, Japan

[73] Assignees: Kanzaki Kokyukoki Mfg., Co., Ltd., Hyogo-ken, Japan; Tuff Torq Corporation, Morristown, Tenn.

[21] Appl. No.: 800,787

[22] Filed: Feb. 14, 1997

[51] Int. Cl.$^6$ .................................................. H16H 3/083
[52] U.S. Cl. ............................................................ 74/371
[58] Field of Search ............................... 74/333, 371, 372

[56] References Cited

U.S. PATENT DOCUMENTS

| | | | |
|---|---|---|---|
| 2,937,539 | 5/1960 | Mueller | 74/372 |
| 4,785,682 | 11/1988 | Nishimura et al. | 74/333 |
| 5,287,769 | 2/1994 | Von Kaler | 74/371 |
| 5,601,000 | 2/1997 | Blanchard | 74/371 |

*Primary Examiner*—Dirk Wright
*Attorney, Agent, or Firm*—Knobbe, Martens, Olson & Bear, LLP

[57] ABSTRACT

A transmission for self-propelled walking lawn mowers comprising a casing (23); an input shaft (10) extending within the casing (23); an output shaft (13) penetrating the casing (23) and connected to drive wheels; an intermediate shaft (25) connected to the input shaft (10) via a transmission gear mechanism (24); a plurality of drive gears (26) and a plurality of driven gears (28) mounted on the output shaft (13) to mesh with each other; connecting means for connecting a gear selected from the plurality of driven gears (28) to the output shaft (13); and a clutch (27) mounted on the intermediate shaft (25) to engage or disengage the drive gear set (26) with or from the intermediate shaft (25). According to the present invention, the load imposed on the clutch is effectively reduced, thereby increasing the service life of the obtained product.

13 Claims, 4 Drawing Sheets

TRANSMISSION FOR SELF-PROPELLED WALKING LAWN MOWERS

BACKGROUND OF THE INVENTION

The present invention relates to a transmission that transmits the rotation of an engine to mower wheels with a reduced rotational speed, and more particularly to a transmission for use in self-propelled walking lawn mowers.

This kind of transmission is disclosed in, for example, Japanese Unexamined utility Model Publication No. 31939/1990 and Japanese Examined Utility Model Publication No. 1538/1995. Generally, these transmissions were the type that reduces the rotational speed of the output shaft than that of the input shaft via transmission gears. More specifically, these transmissions were the low-speed and high-torque type that obtains a large amount of torque at the output shaft.

However, since all the conventional transmissions had a clutch being mounted on the output shaft which generates a high torque, a great deal of load was imposed on the clutch. Accordingly, the clutch was easily worn or damaged, which resulted in a short service life of the transmission.

To ensure a satisfactory increased service life of the transmission by avoiding wear, damage etc. of the clutch, the clutch will inevitably be large-sized, whereby the reduction of the whole transmission size can not be achieved.

It is therefore an object of the present invention to provide a transmission for self-propelled walking lawn mowers, which transmission can reduce the wear or damage of a clutch by reducing the load imposed on the clutch and also can be made compact by reducing the size of the clutch.

Further, it is another object of the present invention to stably support an input shaft introduced into a casing while maintaining the casing compact.

SUMMARY OF THE INVENTION

In order to attain the above objects, the present inventions provides a transmission for self-propelled walking lawn mowers comprising:
 a casing;
 an input shaft connected to a drive source and extending within the casing;
 an output shaft penetrating the casing horizontally;
 an intermediate shaft disposed in parallel to the output shaft and connected to the input shaft via a transmission gear mechanism;
 at least one drive gear mounted on the intermediate shaft;
 a driven gear set comprising at least one gear and being mounted on the output shaft to mesh with the drive gear; and
 a clutch mounted on the intermediate shaft to engage and disengage the drive gear set with and from the intermediate shaft.

Further, the present invention provides a transmission for self-propelled walking lawn mowers comprising:
 a casing;
 an input shaft connected to a drive source and extending horizontally within the casing;
 an output shaft penetrating the casing horizontally; and
 an intermediate shaft disposed in parallel to the output shaft, the intermediate shaft being connected to the input shaft via a first transmission gear mechanism and to the output shaft via a second transmission gear mechanism,
 wherein the casing consists of two mating halves between which the output shaft is held, and
 wherein the first transmission gear mechanism comprises an input gear mounted on the input shaft and a driven gear disposed at one end of the intermediate shaft to mesh with the input gear.

DETAILED DESCRIPTION OF THE PREFERRED EMBODIMENTS

The preferred embodiments of the transmission of the present invention for self-propelled walking lawn mowers will now be described below with reference to FIGS. 1–4.

Figure 1:
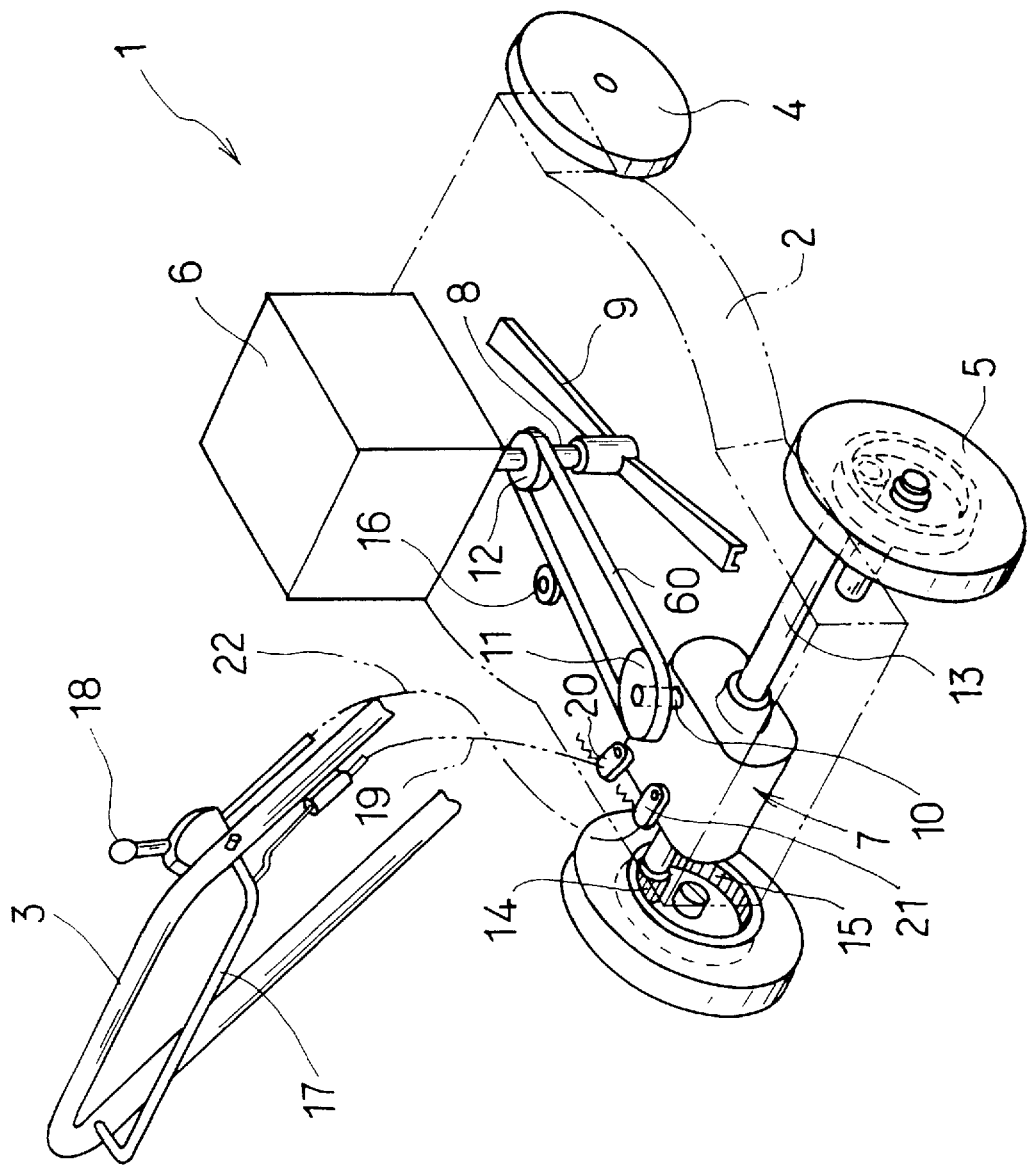
FIG. 1 is a perspective view schematically showing the internal structure of a self-propelled walking lawn mower provided with the transmission of the present invention.

FIG. 1 schematically shows the inside of a self-propelled walking lawn mower 1 on which the transmission of the present invention is mounted. The lawn mower 1 comprises a deck 2 supporting the main body of the lawn mower 1, and a handle 3 for manipulating the mower 1, the deck 2 being provided with fore wheels 4, 4, and rear wheels 5, 5. Mounted inside the lawn mower 1 are a drive unit 6 and a transmission 7. A blade 9 is attached at the end of a drive shaft 8 that extends downwardly from the drive unit 6. A pulley 11 is fixedly mounted at the end of an input shaft 10 introduced into the inside of the transmission 7. A belt 60 connects the pulley 11 with a pulley 12 fixedly mounted on the drive shaft 8, whereby the driving force of the drive unit 6 is transmitted to the transmission 7. An output shaft 13 passing through the transmission 7 horizontally has gears 14, 14 on the opposite ends, each gear meshing with each gear 15 provided on the rear wheels (drive wheels) 5. The belt 60 is maintained taut by a tension roller 16. The handle 3 is provided with a clutch lever 17 and a shift lever 18. The clutch lever 17 is attached pivotally to the horizontal axles mounted near the upper end of the handle 3. When the clutch lever 17 is grasped together with the handle 3, a clutch cable 19 is tensioned, thereby pivoting a clutch arm 20 provided on the transmission 7. The shift lever 18 for changing gears is connected via a gear cable 22 to a shift arm 21 provided on the transmission 7. By operating the shift lever 18, the shift arm 21 can be pivoted. The operations of the clutch and the speed change mechanism by gears will be described later.

Figure 2:
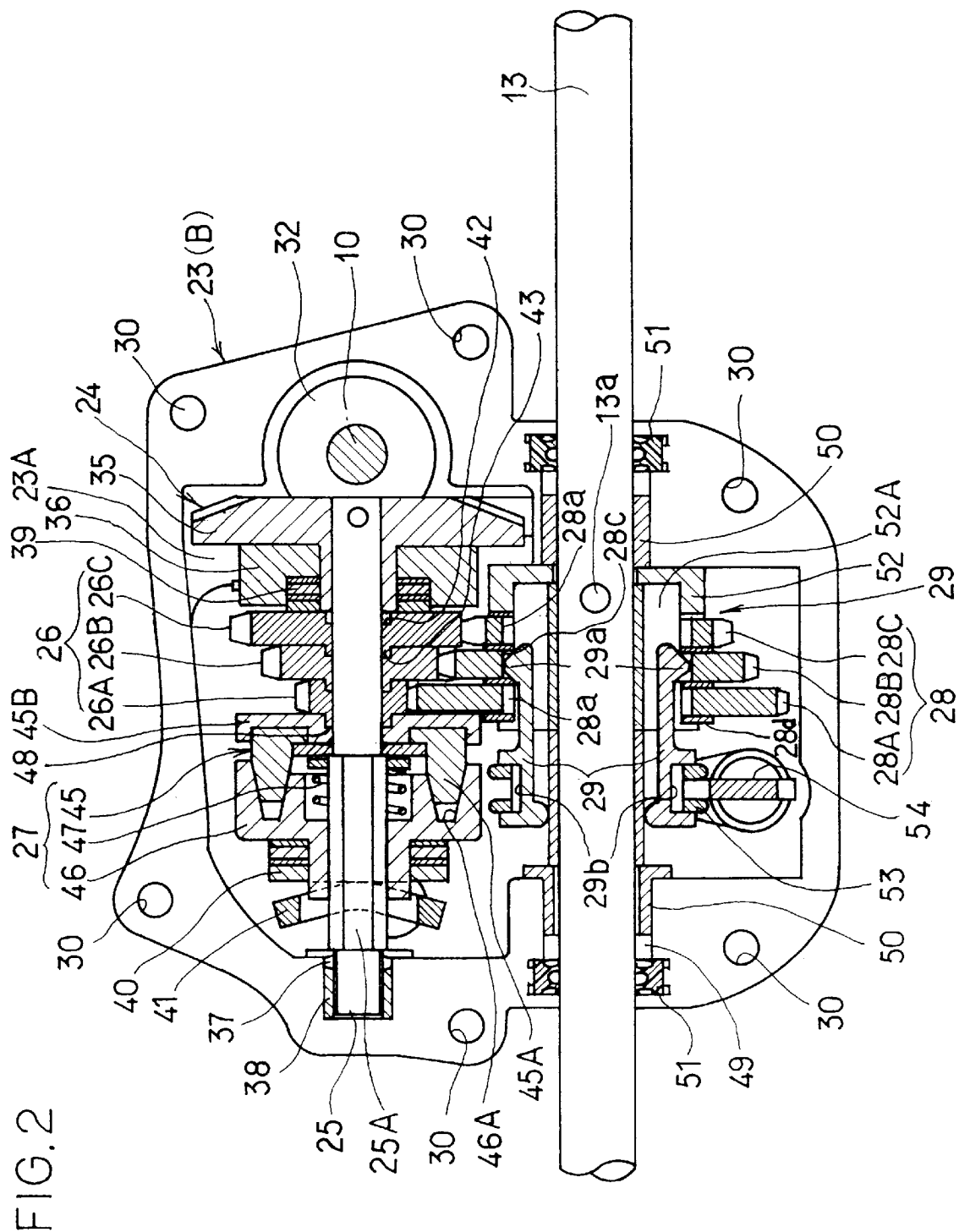
FIG. 2 is a traverse cross section showing an embodiment of the transmission of the present invention for self-propelled walking lawn mowers.
Figure 3:
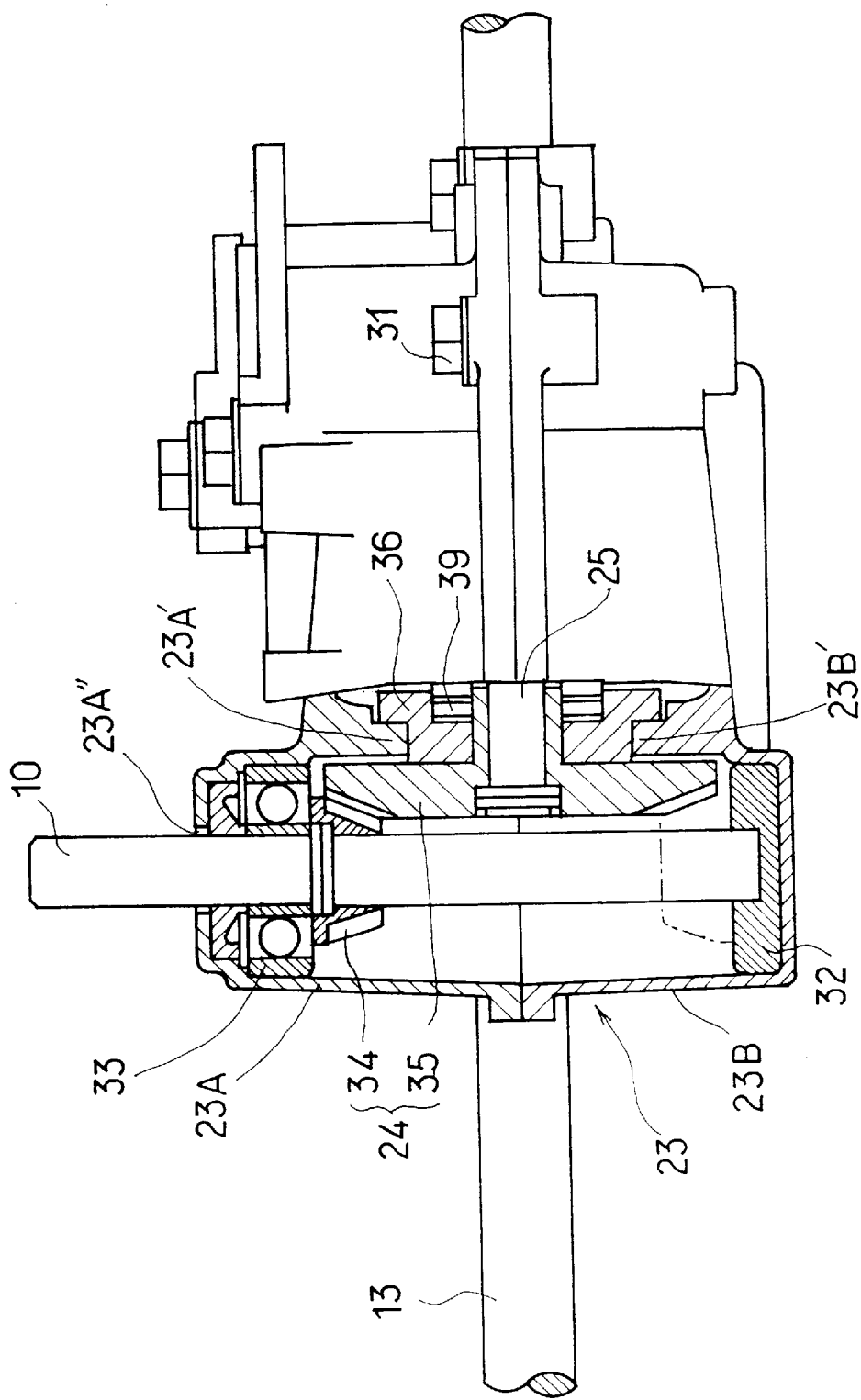
FIG. 3 is a partially cutaway front elevation of the transmission of FIG. 2.
Figure 4:
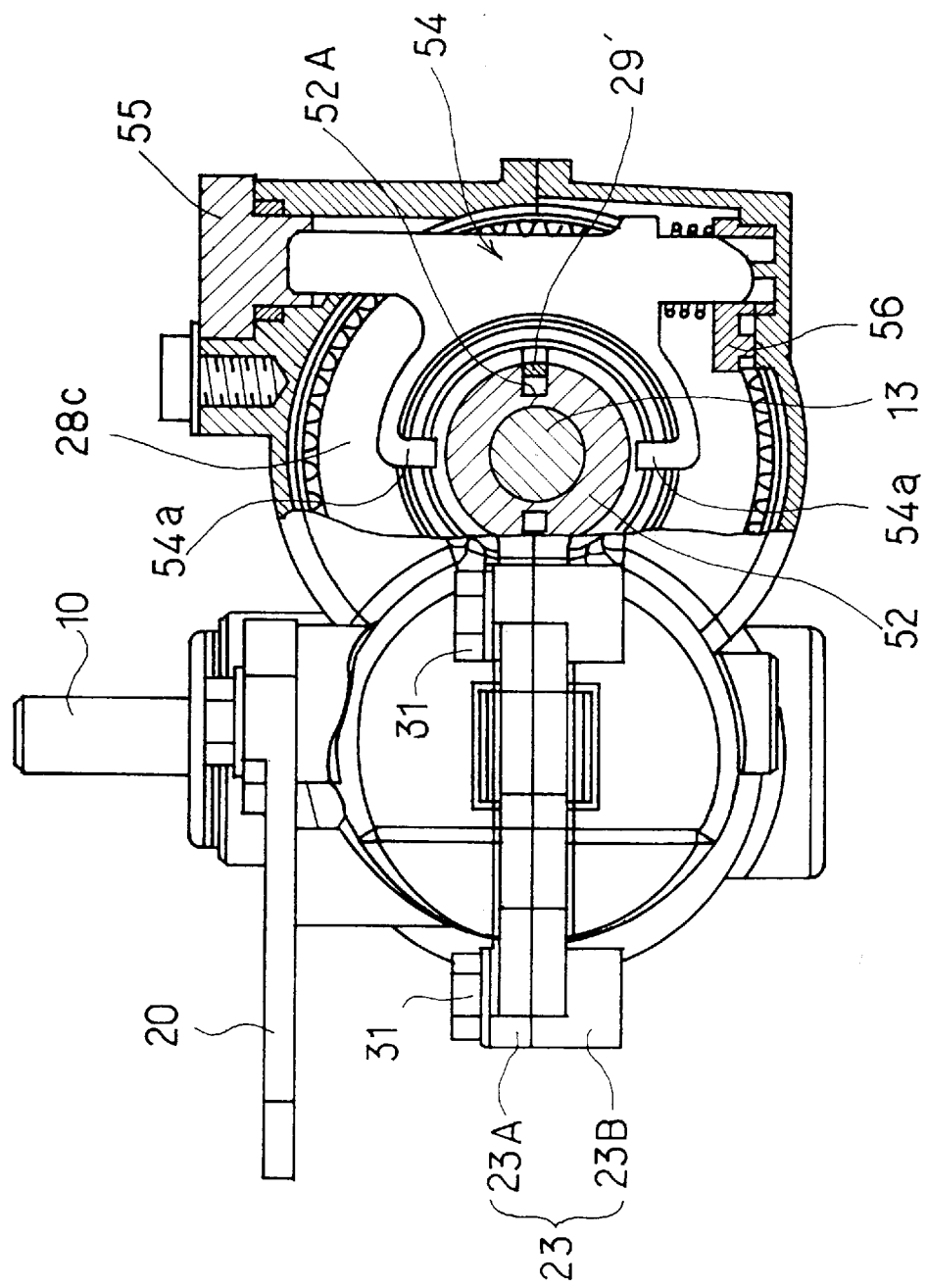
FIG. 4 is a partially cutaway side elevation of the transmission of FIG. 2.

As shown in FIGS. 2–4, the transmission 7 for self-propelled walking lawn mowers comprises a casing 23, an input shaft 10 extending into the inside of the casing 23, a transmission gear mechanism 24 for transmitting the driving force from the input shaft 10, an intermediate shaft 25 being rotatably supported by the casing 23 to receive the driving force from the transmission gear mechanism 24, an output shaft 13 being rotatably supported by the casing 23, a drive gear set 26 being mounted on the intermediate shaft 25, a clutch 27 being mounted on the intermediate shaft 25, a driven gear set 28 which is in constant mesh with the drive gear set 26, a connecting member 29 for selecting a gear having a desired speed reduction ratio from the driven gear set 28 and connecting the selected gear with the output shaft 13.

The casing 23 consists of two parts, i.e., a upper casing half 23A and a lower casing half 23B. The casing halves 23A and 23B are mated along a mating plane which becomes substantially horizontal when the transmission 7 is mounted in the lawn mower 7. The upper and lower casing halves 23A and 23B can be kept mated with bolts 31 being screwed into holes 30 that are formed in the peripheral flanges of the upper and lower casing halves 23A and 23B (only the holes of the lower casing half 23B being shown in FIG. 2).

The input shaft 10 extends from an opening 23A" formed in the top wall to the bottom wall of the casing 23 (FIG. 3). The lower end of the input shaft 10 is supported by a bearing member 32 located on the bottom wall of the casing 23, and the upper end of the input shaft 10 is supported by a bearing 33 provided below the opening 23A". As described, the input shaft 10 extends to reach the bottom wall of the casing 23, and the lower end is supported by the bottom wall of the bearing member 32, whereby the input shaft 10 can be stably supported without two bearings 33 as in a cantilevered input shaft as seen in conventional transmissions. Thus, it is possible to reduce the height dimension of the casing 23.

Fixedly mounted on the input shaft 10 is a small gear 34, and fixedly mounted at one end of the intermediate shaft 25 is a large gear 35 which is in mesh with the small gear 34. These gears 34 and 35 constitute the transmission gear mechanism 24. In this instance, the small and large gears 34 and 35 are bevel gears, and the axes of the input shaft 10 and the intermediate shaft 25 are disposed orthogonal to each other in the plane through the axes. The small gear 34 can be mounted on the input shaft 10 at a lower position of the casing 23 (as shown by a dash line in FIG. 3). When the axes of the input shaft 10 and the intermediate shaft 25 are not in the same plane, the small and large gears 34 and 35 may be hypoid gears.

One end of the intermediate shaft 25 is supported near the large gear 35 by a supporting member 36 which extends from the inner wall of the casing 23, and the other end of the intermediate shaft 25 is supported via a bush 38 fitted in a recess 37 formed on the casing 23. The supporting member 36 is held between brackets 23A' and 23B' which are formed respectively on the upper and lower casing halves 23A and 23B in such a manner that they may face the inside of the casing 23.

Starting with the large gear 35, mounted on the intermediate shaft 25 are the supporting member 36, a thrust bearing 39, a first, second and third drive gears 26A, 26B and 26C, the clutch 27 and a thrust washer 40. A clutch fork 41 can contact the thrust washer 40 with its blades which are disposed on both sides of the intermediate shaft 25.

The first, second and third drive gears 26A, 26B and 26C are axially slidable along and rotatable about the intermediate shaft 25. The respective drive gears are provided with a hexagonal recess 42 around their center holes (in FIG. 2, only the hexagonal recess of the third drive gear 26C being denoted by 42) and a projection 43 for meshing with the recess 42 on the oppositely facing drive gear. The recess 42 and the projection 43 are fitted with each other, so the first to third drive gears 26A–26C rotate together.

The clutch 27 in contact with a side face of the first drive gear 26A comprises a clutch disk 45 consisting of an annular clutch cone 45A and a cone carrier 45B, a concave member 46 having an annular recess 46A which can frictionally contact the clutch cone 45A, and a compression spring (clutch spring) 47 interposed between the clutch disk 45 and the concave member 46.

The clutch cone 45A is coupled with the cone carrier 45B in a dog-clutch manner. The cone carrier 45B is provided with a recess 48, with which the hexagonal projection formed on the third drive gear 26C is fitted. The clutch disk 45 is slidably mounted longitudinally along and rotatably about the intermediate shaft 25.

The left side part 25A of the intermediate shaft 25 shown in FIG. 2 has a hexagonal cross-section to mount the concave member 46 thereon. The diameter of the hexagonal part 25A is larger than that of the other part of the shaft 25, and the clutch disk 45 abuts on one of the end faces of the hexagonal part 25A. The concave member 46 can slide along the intermediate shaft 25, but is prevented from rotating about the hexagonal part 25A, so that the concave member 46 can rotate with the intermediate shaft 25.

The compression spring 47 forces the clutch disc 45 away from the concave member 46, i.e., forces the clutch disk 45 in such a direction as to disengage the clutch.

Accordingly, when the clutch fork 41 is out of operation, the drive gear set 26 runs idle. In this state, the thrust force applied on the supporting member 36 by the clutch spring 47 is set larger than that from the large gear 35 which is in pressure contact with the small gear 34. When the clutch fork 41 is operated to press the concave member 46, the clutch disc 45 frictionally engages with the second concave member 46.

By this frictional engagement, the rotational force of the intermediate shaft 25 is transmitted via the clutch 27 to the drive gear set 26. The clutch 27 to be used in the invention is not limited to the above-mentioned type, but may be another type such as a ball clutch, dog clutch, etc . . . .

The driven gear set 28 meshing with the drive gear set 26 lies idle on the output shaft 13. The output shaft 13 is inserted into and supported by bushes 50 which are fitted in semicircular recesses 49 formed on the upper and lower casing halves 23A and 23B, respectively. In the figure, the reference numeral 51 denotes an oil seal.

The driven gear set 28 consists of a low gear 28A, a second gear 28B and a third gear 28C which are in constant mesh with a first drive gear 26A, a second drive gear 26B, and a third drive gear 26C, respectively.

One gear is selected from among the driven gear set 28, and the selected gear is then connected to the output shaft 13 by means of the connecting means 29. The connecting means 29, as shown in FIGS. 2 and 4, may be of the key type. This connecting means 29 may comprise a fixed sleeve 52 fixedly mounted on the output shaft 13 by means of a pin 13*a* and a pair of shifter keys 29' inserted into a pair of longitudinal grooves 52A axially formed on the fixed sleeve 52. The driven gear set 28 is rotatably fitted on the fixed sleeve 52. Formed around one end portion of the shifter key 29' is a gear selecting projection 29*a* which outwardly radically projects, and formed around the other end portion of the shifter key 29' is a circumferential groove 29*b* for securing a shifter sleeve 53. The gears 28A–28C are provided with key ways 28*a*, 28*b* and 28*c*, respectively, with each of which the projection 29*a* can engage selectively. As shown in FIGS. 2 and 4, a shifter fork extends vertically in the casing 23 and comprises upper and lower fingers 54*a*, each end of which engages the shifter sleeve 53.

The upper end of the shifter fork 54, as shown in FIG. 4, is secured to a boss 55 which is rotatably attached on the casing 23, and the lower end of the shifter fork 54 is fitted in a bush 56 provided on the bottom of the casing 23, so that the shifter fork 54 is rotatably supported. An arm 21 as shown in FIG. 1 is secured at the boss 55, so that when the shift lever 18 is operated to tension a speed change cable 22 and then pivot the shift arm 21 with the boss 55, i.e., the shifter fork 54. When the shifter fork 54 is pivoted, the shifter key 29' with which the finger 54a engages via the shifter sleeve 53 is shifted axially along the output shaft 13, so as to mesh with one of the driven gear set 28A, 28B or 28C to be selected.

Attached on either side of the respective gears 28A, 28B, and 28C are partition walls 28d for maintaining the engagement of the selected gear with the shifter key 29'. The projection 29a of the shifter key 29', when axially shifting, brushes over the partition walls 28d against the radial spring force of the shifter key 29'.

The operation of the transmission of the invention for self-propelled walking lawn mowers will now be described below with reference to the embodiment.

When the drive unit 6 is started, the intermediate shaft 25 is rotated via the drive shaft 8, the pulley 12, the belt 60, the pulley 11, the input shaft 10 and the transmission gear mechanism 24. The drive gear set 26 mounted on the intermediate shaft 25 is rotatable freely thereon when the clutch 27 is disengaged. At this time, the intermediate shaft 25 is idle with respect to the drive gear set 26.

To connect the drive gear set 26 with the intermediate shaft 25, the clutch 27 is frictionally engaged. When the clutch lever 17 is gripped together with the handle 3, the clutch cable 22 is tensioned so as to operate the clutch arm 20 (FIGS. 1 and 4). By the operation of the clutch arm 20, the clutch fork 41 presses the concave member 46 via a thrust washer 40, and then the concave member 46 frictionally engages the clutch cone 45A against the spring force of the compression coil spring 47, whereby the clutch disk 45 rotates. The hexagonal recesses 48 and 42 are adapted to be fitted with the projection 43 so that the rotation of the clutch disk 45 is transmitted to the drive gear set 26. Thus, the clutch disk 45, the concave member 46, and the drive gear set 26 rotate with the intermediate shaft 25.

When the rotational force of the input shaft 10 is transmitted to the drive gear set 26, the driven gear set 28 in constant mesh with the drive gears 26 is rotated. For selecting a reduction gear ratio, the shifter fork 54 is pivoted so as to shift the shifter key 29'. The shifter fork 54 is pivoted by operating the shift lever 18 (FIG. 1). When the projection 29a of the shifter key 29' is connected with one gear to be selected from the driven gear set 28, the rotational force is transmitted only to the gear (the second gear 28B in FIG. 2) engaged with the shift key 29'. The rotational force of the selected gear (28B) is then transmitted to the output shaft 13 so as to drive the drive wheels 5 and 5 via the gears 14 and 15.

To stop the operation of the lawn mower, the clutch lever 17 is released to slack the clutch cable 19. Then, the concave member 46 is shifted away from the clutch cone 45A by the spring force of the compression spring 47, and the frictional engagement therebetween is released, so that the rotational force of the concave member 46 is not transmitted to the clutch cone 45A. Therefore, the drive gear set 26 does not rotate with the intermediate shaft 25. Thus, the rotation of the output shaft 13 is stopped and the lawn mower 1 stops traveling. Additionally, the partial slipping engagement of the clutch can also be realized by appropriately grasping the clutch lever 17.

As is apparent from the forgoing, the transmission of the present invention for self-propelled walking lawn mowers has the following advantages.

Much load is not imposed on the clutch 27, since the clutch 27 is not mounted on the output shaft 13 having a large torque, but on the intermediate shaft 25 having a torque smaller than the output shaft 13. Accordingly, the service life of the transmission is increased, and the clutch can be made compact so that the entire size of the transmission can be reduced.

The embodiment described above is a preferred embodiment of this invention, but equivalent embodiments will occur to those skilled in the art.

We claim:

1. A transmission for self-propelled walking lawn mowers comprising:

a casing having a top wall and a bottom wall;

an input shaft connected to a drive source and extending within the casing;

an output shaft penetrating the casing and adapted to be connected to drive wheels;

an intermediate shaft disposed parallel to the output shaft and connected to the input shaft via a transmission gear mechanism;

at least one drive gear mounted on the intermediate shaft;

a driven gear set, comprising at least one gear, mounted on the output shaft to mesh with the drive gear; and a clutch mounted on the intermediate shaft to engage and disengage the drive gear set with and from the intermediate shaft, wherein the intermediate shaft comprises a first end supported by the casing and a second end terminating inside the casing, and wherein the transmission gear mechanism comprises a large gear fixedly mounted at the second end of the intermediate shaft and a small gear disposed between the large gear and the oppositely facing wall of the casing and fixedly mounted on the input shaft to mesh with the large gear.

2. A transmission for self-propelled walking lawn mowers comprising:

a casing having a top wall and a bottom wall;

an input shaft connected to a drive source and extending within the casing;

an output shaft penetrating the casing and adapted to be connected to drive wheels;

an intermediate shaft disposed parallel to the output shaft and connected to the input shaft via a transmission gear mechanism;

at least one drive gear mounted on the intermediate shaft;

a driven gear set, comprising at least one gear, mounted on the output shaft to mesh with the drive gear; and a clutch mounted on the intermediate shaft to engage and disengage the drive gear set with and from the intermediate shaft, wherein the input shaft extends from the top wall to the bottom wall of the casing and is supported by these walls.

3. The transmission according to claim 1, wherein the intermediate shaft is supported near the second end thereof by a supporting member disposed in the casing.

4. A transmission for self-propelled walking lawn mowers comprising:

a casing having a top wall and a bottom wall;

an input shaft connected to a drive source and extending within the casing;

an output shaft penetrating the casing and adapted to be connected to drive wheels;

an intermediate shaft disposed parallel to the output shaft and connected to the input shaft via a transmission gear mechanism;

at least one drive gear mounted on the intermediate shaft;

a driven gear set, comprising at least one gear, mounted on the output shaft to mesh with the drive gear; and a clutch mounted on the intermediate shaft to engage and disengage the drive gear set with and from the intermediate shaft, wherein the clutch is a cone-shaped clutch.

5. The transmission according to claim 1, wherein the clutch is a dog clutch.

6. The transmission according to claim 2, wherein the clutch is a dog clutch.

7. The transmission according to claim 4, wherein the clutch is a dog clutch.

8. A transmission for self-propelled walking lawn mowers comprising:

a casing;

an input shaft connected to a drive source and extending horizontally within the casing;

an output shaft penetrating the casing and adapted to be connected to drive wheels; and an intermediate shaft disposed parallel to the output shaft, the intermediate shaft being connected to the input shaft via a first transmission gear mechanism and to the output shaft via a second transmission gear mechanism, wherein the casing consists of two mating halves between which the output shaft is held, and wherein the first transmission gear mechanism comprises an input gear mounted on the input shaft and a driven gear disposed at one end of the intermediate shaft to mesh with the input gear.

9. The transmission according to claim 8, wherein a clutch is mounted on the intermediate shaft.

10. The transmission according to claim 9, wherein one or more reduction gears are disposed between the driven gear and the clutch.

11. The transmission according to claim 9, wherein a driven gear set is mounted on the output shaft.

12. The transmission according to claim 11, wherein the axes of the output shaft and the driven gear set on the output shaft and the axes of the intermediate shaft and the clutch on the intermediate shaft are disposed on the mating plane between the two casing halves.

13. The transmission according to claim 9, wherein a plurality of drive gears are disposed, each of the drive gears being provided with a projection and a recess, the projection on one of the drive gears being adapted to fit with the recess formed on the oppositely facing drive gear, so that the rotational force from the clutch is transmitted to all the drive gears.

* * * * *